Figures 1, 2:
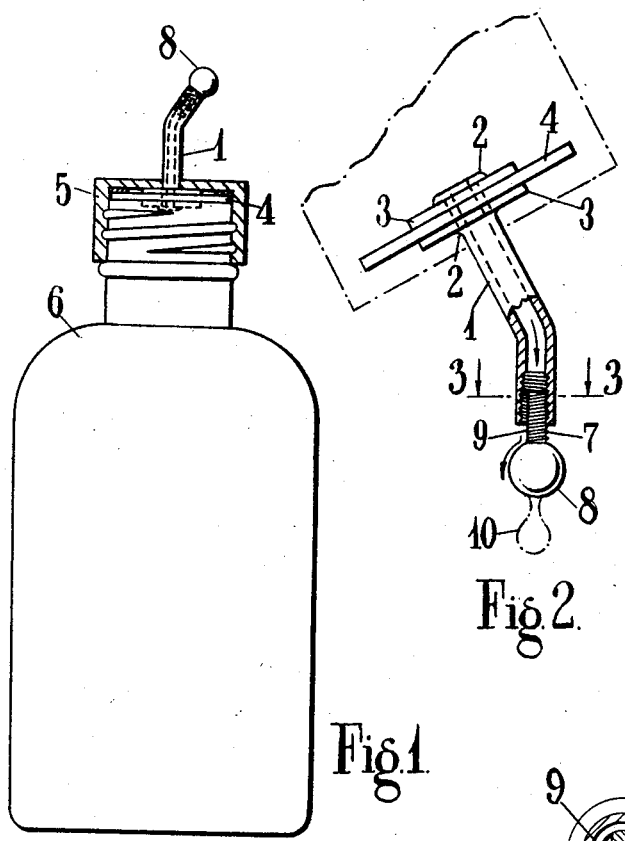

Feb. 26, 1957 S. W. WILDING 2,782,964
DROPPER DEVICE FOR MEASURING AND DISPENSING LIQUIDS
Filed July 29, 1955

Inventor
S. W. Wilding
By Hancock Downing Seebold
Attys

United States Patent Office 2,782,964
Patented Feb. 26, 1957

2,782,964

DROPPER DEVICE FOR MEASURING AND DISPENSING LIQUIDS

Sidney William Wilding, London, England, assignor to The Amalgamated Dental Company Limited, London, England Application July 29, 1955, Serial No. 525,339

2 Claims. (Cl. 222—422)

This invention relates to dropper devices for measuring and dispensing liquids of the kind comprising a discharge tube or spout connected or connectable with the mouth of a container so that liquid in the latter can be dispensed in the form of drops from the discharge end of the tube or spout when the container is tilted and/or, in the case of a flexible container, gently squeezed. In the past, this kind of device has not been associated with the accurate dispensing of small quantities of liquid, because the size of the individual drops tended to vary with the precise angle at which the container, and hence the tube or spout was held. Especially in the case of discharge tubes did the drop size vary with the degree of tilt. These tubes are made generally of a short length of tubing which may be aluminium (aluminium-base alloy or plastic tubing, attached to or formed with a flange at one end adapted to seat over the mouth of a bottle and be retained thereon by a cap formed with an aperture through which the tubing extends.

A device of the kind referred to is already known, which comprises a dropper member on to which liquid discharged from the tube or spout will in use, flow and from which, by suitable regulation of the discharge rate, the liquid may be constrained to fall as discrete drops, the surface of said member from which the drops hang preparatory to falling off being a convex substantially spherical segment for a range of tilting angles of the device, preferably a range of at least 90°.

The use of the dropper member results in a greatly improved uniformity of drop size as compared with that hitherto normally obtained, as the surface from which the successive drops hang does not alter despite a range of variation in the angle at which the device is tilted in use.

In accordance with this invention the dropper member is detachably engaged with, or adjustably attached to, the discharge end of an outlet tube so as to serve, when desired, as a stopper, the dropper member being in the form of a ball at the end of a short stem formed with a flat, so as to close the tube when the stem is fully inserted (for which purpose the end of the tube may be countersunk) and serve as dropper member when the stem is not fully inserted. The stem and interior of the tube may be in screw threaded engagement.

It has been found that the size of drop formed, in the case of a spherical dropper surface, varies with the curvature of the surface as well as with the nature of the liquid. Using a brass ball at an end of a short stem as described above, the following results were obtained:

| Radius of curvature of surface (mm.) | Volume of drops formed (ml.) | |
|---|---|---|
| | Methyl methacrylate | Water and 1% of detergent |
| 1 | 0.0125 | 0.0110 |
| 1.5 | 0.0165 | 0.0145 |
| 2 | 0.0200 | 0.0180 |
| 2.5 | 0.0230 | 0.0205 |
| 3 | 0.0255 | 0.0220 |
| 3.5 | 0.0275 | 0.0230 |
| 4 | 0.0290 | 0.0240 |
| 4.5 | 0.0305 | 0.0245 |

With 90% alcohol, the same results were found as for methyl methacrylate.

The invention finds particular application to dispensers for methyl methacrylate as used for compounding, in small quantities at a time, with polymeric methyl methacrylate in the preparation of dental protheses and plastic fillings.

Figure 3:
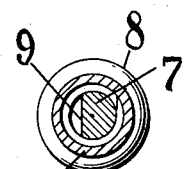

One embodiment of this invention is shown in the accompanying drawings, of which Figure 1 shows the device fitted to a bottle,
Figure 2 shows the device in operation, and
Figure 3 is a sectional view on the line III—III of Figure 2.

The device comprises a pouring or discharge tube 1 formed adjacent one end with two spaced annular flanges 2 between which two small washers 3 are carried. The latter grip between them a larger washer 4 of readily deformable material such as polyethylene suitable as a seal between a centrally apertured screw cap 5 and the mouth of a bottle 6. Arrangements of this kind are well known, for example, on lighter fuel dispensers.

At the other end the pouring tube is internally threaded and engaged with a short length of studding 7 attached to a ball 8, which may conveniently be formed as a cap nut. The studding is formed with a flat 9. In the pouring position, with studding 7 partially unscrewed from tube 1, any liquid in bottle 6 will flow along the flat 9 on to ball 8 and drop off, as shown figuratively at 10. The angle of tilt shown in Figure 2 corresponds to an almost empty bottle, but the dropping surface of ball 8 is the same as for the much lesser angle corresponding to a full bottle.

As shown in Figure 1, when studding 7 is screwed up tight, ball 8 serves to seal the end of tube 1.

The arrangement shown in the drawings is principally suitable for mobile liquids where expansion of air in the bottle caused by the warmth of the hand will expel the contents, otherwise, especially for oils and other viscous liquid in rigid containers, a breathing hole may be required or a flexible bottle may be used.

It will be understood that the materials used should be resistant to, and the ball wetted by, the liquid to be dispensed.

The ball may conveniently be of metal or plastic and, especially in the latter case, may be moulded integrally with the studding. The latter may, if desired, be substituted by a stem which is a push fit in the pouring tube, formed with a flat, or with a groove or perforated bore for the passage of liquid.

I claim:

1. A dropper device for measuring and dispensing liquids comprising a pouring tube and a dropper member adjustably engaged therewith, the dropper member being in the form of a ball at the end of a short stem formed with a flat so as to close the tube when the stem is fully inserted therein but affording fluid access to the ball when the stem is only partly inserted.

2. A device as set forth in claim 1 in which the stem and interior of the tube are in screw threaded engagement.

References Cited in the file of this patent

UNITED STATES PATENTS 2,321,369    Dubilier   ---------------- June 8, 1943

FOREIGN PATENTS 563,971    Great Britain ------------ Sept. 7, 1944